(12) United States Patent
Theiste et al.

(10) Patent No.: US 9,195,958 B2
(45) Date of Patent: Nov. 24, 2015

(54) SYSTEM AND METHOD FOR SELLING PRESENTATION TIMES IN A DIGITAL MEDIA STREAM

(75) Inventors: Christopher H. Theiste, Plymouth, MN (US); Joseph Agee, Richfield, MN (US)

(73) Assignee: Regal Cinemedia Corporation, Centennial, CO (US)

( * ) Notice: Subject to any disclaimer, the term of this patent is extended or adjusted under 35 U.S.C. 154(b) by 2319 days.

(21) Appl. No.: 10/641,173

(22) Filed: Aug. 14, 2003

(65) Prior Publication Data

US 2005/0038666 A1   Feb. 17, 2005

(51) Int. Cl.
| G06Q 30/00 | (2012.01) |
| G06Q 10/08 | (2012.01) |
| G06Q 30/02 | (2012.01) |
| G05B 19/418 | (2006.01) |

(52) U.S. Cl.
CPC .............. *G06Q 10/087* (2013.01); *G06Q 30/02* (2013.01)

(58) Field of Classification Search
USPC .......................................................... 705/14
See application file for complete search history.

(56) References Cited

U.S. PATENT DOCUMENTS

| 5,801,754 | A | | 9/1998 | Ruybal et al. |
| 5,836,529 | A | * | 11/1998 | Gibbs ........................ 246/122 R |
| 5,892,535 | A | | 4/1999 | Allen et al. |
| 5,924,013 | A | | 7/1999 | Guido et al. |
| 6,044,403 | A | | 3/2000 | Gerszberg et al. |
| 6,141,530 | A | | 10/2000 | Rabowsky |
| 6,177,931 | B1 | | 1/2001 | Alexander et al. |
| 6,384,893 | B1 | * | 5/2002 | Mercs et al. ................... 352/133 |
| 6,414,602 | B2 | | 7/2002 | Polyakov |
| 6,424,998 | B2 | | 7/2002 | Hunter |
| 6,430,603 | B2 | | 8/2002 | Hunter |
| 6,430,605 | B2 | | 8/2002 | Hunter |
| 6,633,982 | B1 | | 10/2003 | Kurzeja |
| 6,735,776 | B1 | | 5/2004 | Legate |
| 6,754,747 | B2 | | 6/2004 | Locklear et al. |
| 2001/0055466 | A1 | * | 12/2001 | Iwashita ......................... 386/46 |
| 2002/0095357 | A1 | | 7/2002 | Hunter et al. |
| 2002/0112243 | A1 | | 8/2002 | Hunter |
| 2002/0138832 | A1 | | 9/2002 | Svoboda |
| 2003/0170000 | A1 | * | 9/2003 | Iwashita et al. ................. 386/46 |
| 2003/0194995 | A1 | * | 10/2003 | Handerson et al. ......... 455/422.1 |
| 2004/0109137 | A1 | * | 6/2004 | Bubie et al. ..................... 352/40 |
| 2004/0216163 | A1 | * | 10/2004 | Whitcomb ..................... 725/74 |
| 2004/0223741 | A1 | * | 11/2004 | Yoo et al. ........................ 386/95 |
| 2004/0249613 | A1 | * | 12/2004 | Sprogis et al. ................ 702/188 |
| 2005/0076372 | A1 | * | 4/2005 | Moore et al. ..................... 725/78 |

FOREIGN PATENT DOCUMENTS

JP          2003244625 A   *   8/2003   ............... H04N 5/91

* cited by examiner

*Primary Examiner* — Victoria Vanderhorst
(74) *Attorney, Agent, or Firm* — Hogan Lovells US LLP; Peter J. Meza (57) ABSTRACT

A method for automatically developing a proposal of advertising segments from a plurality of available advertising segments offered by an owner of a media presentation containing the advertising segments. A plurality of representations of available advertising segments are stored, and actual and/or speculative presentation characteristics are associated to each of the plurality of representations. A proposal is developed comprising a subset of the representations based on media buyer specified variables. The proposal is validated by ensuring that the speculative characteristics are satisfied upon creation of the media presentation containing segments purchased by the media buyer.

23 Claims, 8 Drawing Sheets

SYSTEM AND METHOD FOR SELLING PRESENTATION TIMES IN A DIGITAL MEDIA STREAM

BACKGROUND OF THE INVENTION

1. Field of the Invention

The present invention relates, in general, to systems and methods for displaying movies, advertising, and alternative content, and, more particularly, to software, systems and methods for selling access to presentation times in a media stream before the media stream is constructed.

2. Relevant Background

Presenting information using television, radio, the Internet, movies and the like is a prevailing mode for mass communication. These communication modes allow the presentation of recorded material, live material, and mixtures of recorded and live materials. At a basic level, each of these communication modes enables the presentation of a stream of information in a particular sequence. The impact of a particular message on a recipient is affected by various factors including the timing of the presentation, place of the presentation, and the proximity (both time and location) of other content items that are presented near a particular message. As a result, the message communicated by a particular content item is determined not only by its own content, but by the context in which it is presented.

Media buyers such as content providers, advertisers and advertising agencies are presented with an ever increasing number of options to present material. Traditional media such as television and radio broadcasting have experienced a growth in the number of broadcasters, and, thus, the number of presentation opportunities they offer. While this growth has made the processes of buying and selling "media spots" more complex, these traditional media channels have well-developed systems for rating and pricing time slots throughout the day. These ratings are largely based on historical information. Media purchases rely on carefully planned schedules that specify when primary content, such as entertainment programs, will be presented so that the rating and pricing information is valid. Because schedules are planned weeks or months in advance the important context variables (e.g., program ratings and demographics) are largely, although not completely, known when the media buyer is selecting placement for a particular content item. In other words, the "inventory" of available spots in which to place a content item is known well in advance, making it possible to buy and sell the available spots.

More recently, the large installed base of theatres has been seen as an opportunity for presenting richer and more varied types of content to theatre audiences. Film-based entertainment such as movies, live events combined with film features, and the like remain an important vehicle for entertainment and education throughout the world. The ambiance of a theatre is what continues to draw audiences even though many other venues for watching movies exist. The ambience created by lighting, sound, seating, picture quality, and other factors contribute to a unique entertainment environment that continues to be preferred by audiences. As a result, there exists a significant installed base of theatres in the United States and throughout the world that include equipment and facilities for displaying film-based material.

Conventional theatres, however, have limited resources for scheduling and presenting content items from various sources. Because conventional theatre operations are designed to present a single film, sometimes in conjunction with digital content show advertising, they have not had a need for more sophisticated scheduling techniques. Examples of in-theatre presentations include a pre-feature slide show that displays a repeating loop of advertising slides, often interspersed with entertainment slides. The loop is started at some arbitrary time between shows and repeats until the upcoming feature begins. The loop repeats while the audience is seated such that an ad may appear several times before the feature presentation begins. Optionally, the feature presentation is preceded by trailers advertising other films, where the trailers are physically spliced to the feature film.

More recently, "rolling stock" advertisements have become available in which a short animated feature, film, or other moving-picture feature is presented. Usually, the rolling stock is physically spliced to the beginning of a 35 mm feature film. As a result, there is no flexibility to alter when the rolling stock appears relative to the film, the rolling stock advertisement cannot be repeated during the digital content show as can slides, and the rolling stock will only appear immediately before the feature presentation. Moreover, rolling stock is not well suited to present the wide variety of alternative content that is available.

In comparison to television and radio media channels, movie theatre scheduling is relatively ad hoc. A theatre operator may select which films will be presented at a particular theatre only a few weeks or days in advance of the actual presentation. For some types of presentations, the theatre operator may desire an even shorter lead time. Further, a theatre typically has multiple auditoriums and the selection of which auditorium will be used for a particular feature film may be constantly changing. Hence, in the theatre environment there is little prior knowledge of the environment or context in which a content item may be presented. As a result, buying and selling spots for presentation within a theatre has been even more difficult that with conventional media channels.

Hence, many of the advantages possible with digital cinema cannot be achieved without significant improvements in the way in which theatres schedule content for display. For example, even though digital cinema techniques allow a presentation to be compiled from one or more sources very quickly, content providers who wish to influence the context and environment in which their content is presented are less willing to relinquish complete control over the presentation to the theatre operator. As a result, existing efforts towards digital cinema follow a model of conventional film-based presentations by compiling a presentation well in advance.

It would also be desirable if digital cinema could be scheduled to more specifically target various audience characteristics. For example, it would be desirable to geographically tailor a nationwide business presentation or sales presentation to more specifically address each audience's needs. Conventional in-theatre systems fail to capture the value of being able to target the audience. Accordingly, it would be desirable to schedule digital cinema features in a way that targeted specific audience characteristics.

In view of the above, there is an acute need for systems and methods for buying and selling presentation times in a media stream, particularly systems and methods that can be implemented within digital theatre environments and other locations where media is presented to an audience.

SUMMARY OF THE INVENTION

Briefly stated, the present invention involves a method for automatically developing a proposal of advertising segments from a plurality of available advertising segments offered by an owner of a media presentation containing the advertising segments. A plurality of representations of available advertising segments are stored, and actual and/or speculative presentation characteristics are associated to each of the plurality of representations. A proposal is developed comprising a subset of the representations based on media buyer specified variables. The proposal is validated by ensuring that the speculative characteristics are satisfied upon creation of the media presentation containing segments purchased by the media buyer.

In another aspect, the present invention involves a proposal machine having an interface to a media scheduling database for receiving inventory information about an inventory of segments within one or more media streams, wherein the inventory information includes actual and speculative presentation characteristics of the segments. The proposal machine further includes an interface for receiving information about a media buyer's presentation requirements. Processes within the proposal machine determine a set of the segments from the scheduling database that satisfy the media buyer's presentation requirements based on the actual and speculative presentation characteristics of the segments. Processes within the proposal machine also generate a proposal to the media buyer identifying the determined set of segments.

DETAILED DESCRIPTION OF THE PREFERRED EMBODIMENTS

The present invention is directed to systems and methods that involve time within a media presentation to be bought and sold prior to using speculative information about the total contents of the presentation. In this manner, media buyers can specify desired presentation criteria and purchase portions of a future presentation that will meet the specified criteria. The presentation is assembled over time as specific content items become available for actual (i.e., non-speculative) scheduling. The presentation assembly is performed so as to produce a final presentation that satisfies the presentation criteria. The presentation assembly may take place any time before the actual presentation, up until just a few moments before the actual presentation. As a result, the time slots that make up a presentation are much easier to market, buy and sell well in advance of the assignment of specific content items to fill the presentation, while at the same time ensuring media buyers expectations are satisfied.

The present invention is particularly useful in a theatre environment. For example, it is possible to estimate the number of screens available for a particular content item requirement using average percentages of movies that are classified with each movie rating. From this estimate "virtual auditoriums" can be used as "place holders" for digital content shows with particular requirements or characteristics. The system can then schedule media buys (e.g., presentation contracts) to the place holder auditoriums, thereby selling this "virtual inventory" before it actually comes into existence, and tracking that inventory through the term of the contract. As specific films are scheduled in specific auditoriums, real inventory becomes available and the contracts can be reassigned to an appropriate auditorium. The system of the present invention is desirably able to reconcile this virtual inventory against the actual inventory that is created at show time.

The present invention is illustrated and described in terms of a distributed theatre environment such as might be implemented by a national chain of theatres or an organization of cooperating independent theatre owners. However, the present invention is readily scaled to provide both international and local services, and may be implemented in a single venue. Moreover, the systems and methods for scheduling are applicable to a wide variety of media channels including television, radio, the Internet, live events, and the like where it is desired to allow a media buyer to influence the time and/or location or other environmental criteria related to the actual presentation, but where these presentation environmental variables are not completely known at the time the media purchase is made.

More generally, the invention provides systems and mechanisms for buying and selling segments within a media stream. The term media stream is used to refer to data that represents and can be played on an appropriate player device to create an audible, visual, or other communication with an audience or viewer. A media stream may comprise a single type of media (e.g., audio-only) or may comprise multiple types of media (e.g., audio and video). Further, a media stream may be played on a single device or on separate devices. For example, a media stream may include audio information that is played back on audio equipment and video information that is played back on a projector. In a more extreme example, a media stream might include text and/or video information that would play back on an electronic billboard, and a audio information that would play back through a stadium sound system. Hence, a single media stream may include components that are presented simultaneously or sequentially.

It should be understood that while the exemplary implementations involve presentation of digital content shows in conjunction with a main feature within a theatre, the present invention is broadly applicable to scheduling digital content shows at any time before, during, and after a main feature or live event as well as scheduling digital content shows that will be presented alone (i.e., not in conjunction with a main feature or live event). Moreover, while the examples primarily involve theatre environments, it is contemplated that other entertainment venues and types may benefit from the present invention.

It is contemplated that the present invention will find applicability in many events that consist of or comprise the presentation of digital media or multimedia content. An "event" is construed broadly to mean live performances, live broadcasts or transmissions, as well as performances and transmissions of pre-recorded events. An event may take a single moment in time, or span a period of time. An event may itself comprise a continuous or discontinuous sequence of events. For example, live, broadcast, and multicast events such as concerts, sporting events, plays, speeches and the like may beneficially employ features of the present invention. Further, the present invention may be used to include pre-recorded features before, during, or after a primary feature presentation.

Figure 1:
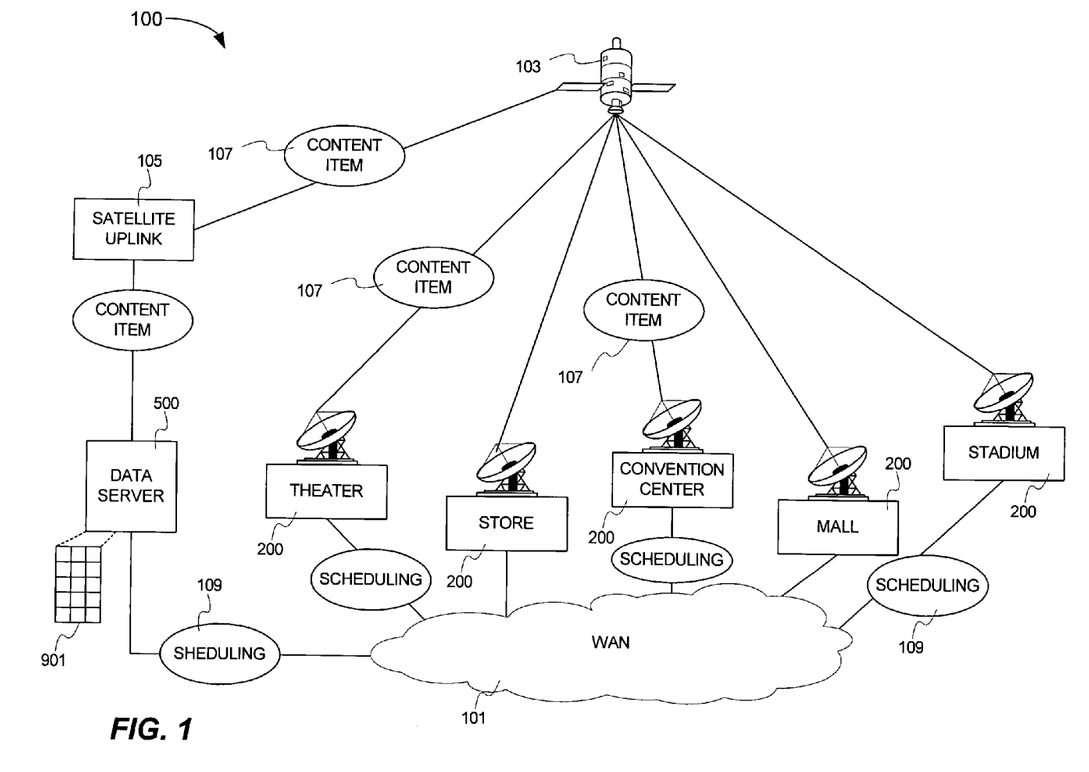
FIG. 1 shows a networked theatre environment in which the present invention is implemented.

FIG. 1 shows an exemplary environment 100 in which the present invention may be implemented. Environment 100 includes a plurality of presentation facilities 200, including theatres, malls, convention centers, stores, sporting facilities and the like at which media is presented to an audience of one or more viewers. Each presentation facility 200 is coupled to a data communication network such as wide area network (WAN) 101. Presentation facilities 200 may be distributed over any geographic area including regionally, nationally, or world-wide. A significant advantage of the present invention is that it enables coordinated, centralized sales of presentation time in a wide variety of presentation formats and locations so that media buyers can place orders for digital content presentation to geographically and demographically diverse audiences. Because features of the present invention enable targeting to be improved over this diverse group of presentation facilities 200, the market for presentation times is larger than if each facility 200 were to attempt to sell presentation times individually. Also, because media buyers are able to order presentation of a wide variety of content sources, including live segments, pre-recorded segments, audience targeted segments, still pictures, moving pictures, animation, audio, and the like, the systems in accordance with the present invention support a much broader range of applications. Moreover, because digital content items and digital content shows will reach a larger audience, content producers can justify greater expense to produce digital content items, making the entire experience more enjoyable.

Figure 5:
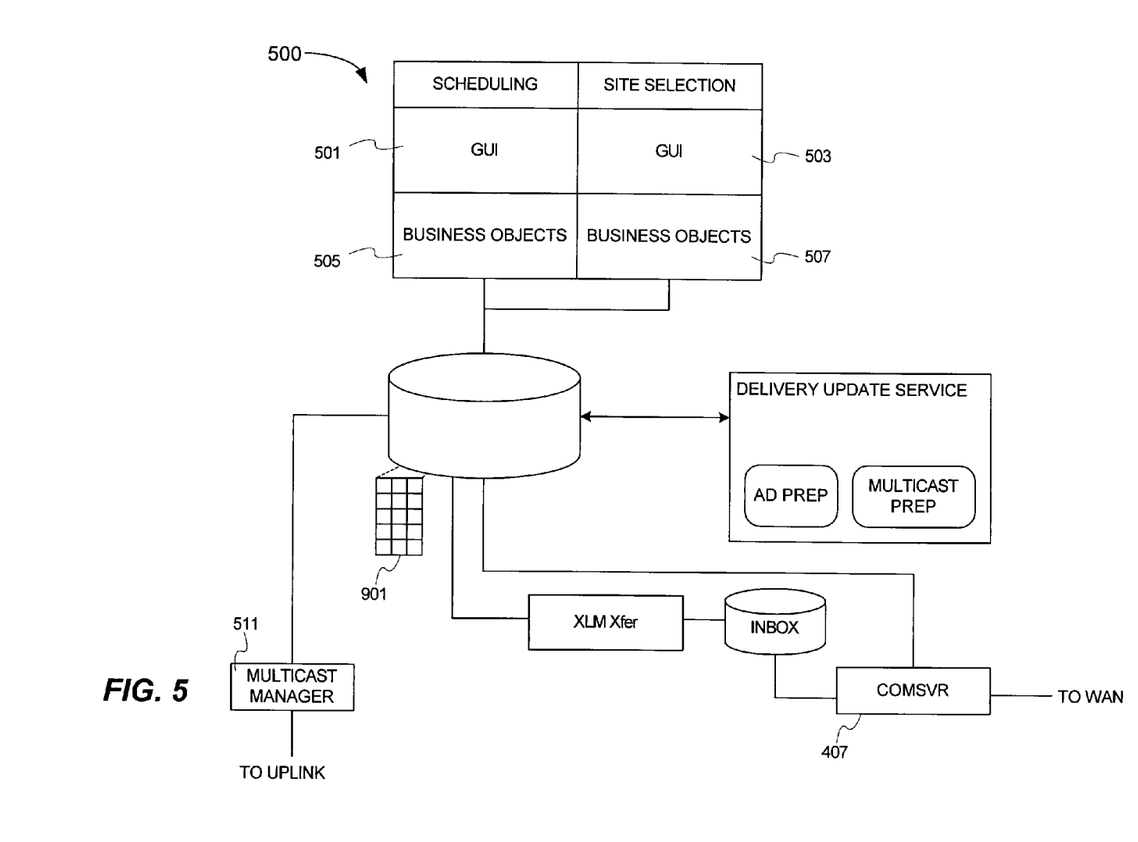
FIG. 5 shows data center components in accordance with the present invention.

Environment 100 also includes one or more shared resources such as data server 500, described in greater detail in reference to FIG. 5. Data server 500 implements services to distribute content items 107, such as advertisements, training material, live entertainment, recorded entertainment, seminar presentation, and the like, to appropriate presentation facilities 200. Data server 500 also implements services to distribute scheduling information 109 that can be used by facilities 200 to create and present appropriate presentations such as digital content shows. In a particular example, data server 500 maintains a "schedule grid" 900 that contains inventory information individually for each presentation device in a facility 200.

Inventory information is a collection of presentation slots or segments within a media stream. Each segment has various presentation characteristics that can be or have been sold. The presentation characteristics of a particular segment are affected by a variety of factors including other content items in a media stream, the location of the presentation device, time at which a presentation occurs, and other environmental variables. Some of these environmental variables can be determined well in advance of a presentation, while others can be determined only a short time before a presentation.

For example, each content item in a media stream affects the character of every other content item in a media stream. In the context of a movie theatre, for example, the rating of a feature film in the media stream will impact the character of other segments in the stream. This interdependence has hampered the ability to buy and sell segments in a media stream when the media buyer is concerned about the affect of other content items in the media stream. This is a particularly limitation in environments where the selection of content items may take place just before a presentation begins.

In another example, some environmental variables such as audience size, audience demographics, and unpredictable events occurring at a presentation location make it impossible to predict with certainty some characteristics of a presentation segment. If a media buyer desires to place an advertisement so that it is presented on a scoreboard within 5 minutes of a home team score, traditional media buying systems are unable to respond.

One feature of the present invention is that a media stream is analyzed and characteristics are speculatively assigned to segments within the media stream. The speculative assignment of presentation characteristics has some rational basis found in historical performance, simulation, extrapolation, statistical modeling and the like. This allows the owner of the media stream to create an inventory of presentation segments that have certain characteristics. More accurately, this speculative inventory identifies presentation segments that will have certain characteristics when the actual presentation occurs.

For example, even before a theatre has identified a particular film that will be presented six months in the future, the theatre operator may be able to predict that four screens will be presenting "R" rated movies and two screens will be presenting "PG" rated movies. Assuming each feature film is presented in a media stream that includes 10 other segments for different kinds of content, the present invention enables the theater owner to identify 10×4 or 40 segments as having an "R" rating and 10×2 or 20 segments as having a "PG" rating, creating a speculative (but saleable) inventory of presentation times months or weeks in advance of identifying a particular feature film. The speculative inventory can be bought and sold with a high degree of certainty that it will exist come presentation time.

In the example of a presentation at a sporting event, an estimate of average scores per game can be used to identify how many presentation segments will likely exist that are within five minutes of a scoring event. If the Colorado Rockies average five runs per game at home, the media stream owner can know with some degree of certainty that a typical game will yield 25 one-minute segments within five minutes of a scoring event. In this example, given the wider variation in actual scoring events, the media stream owner may wish to sell only a portion of the speculatively characterized segments. Nevertheless, using the present invention, the media stream owner can create an inventory of time slots or segments that will have very specific characteristics even though the media stream own cannot know with certainty when the segment will be presented.

Referring to FIG. 1, WAN 101 may be implemented by any available networking technology and protocols including private networks and public networks such as the Internet, although in either case appropriate security and authentication protocols may be desirable to prevent unauthorized system access. WAN 101 is primarily configured to support symmetrical or asymmetrical full duplex communication between facilities 200 and data server 500 to exchange scheduling information 109 used to schedule presentation of content items, and to report back on the status of scheduled content items to verify their presentation. However, WAN 101 may also be used to distribute the content items 107 themselves in some circumstances.

Because content items 107 tend to be larger multimedia files, in the particular implementation of FIG. 1 environment 100 includes a high bandwidth broadcast/multicast/unicast communication link implemented, for example, by a digital broadcast satellite (DBS) 103 through satellite uplink 105. Satellite 103 may be a private system, or may be provided by a contact satellite operator such as Hughes Network Systems of Germantown Md. In the particular example, content items 107 comprise media files that, when played, range in length from a few seconds up to several hours of material. The present invention is essentially transparent to the choice of encoding and compression mechanisms in that it is readily adaptable to any available encoding format and compression technique including proprietary mechanisms and industry standard formats such as MPEG-1, MPEG-2 and other MPEG standards that are available, "avi" files (audio video interleaved), "wav" (windows audio video), Windows Media audio and video files (identified by various file extensions such as .asf, .asx, .wax, .wm, .wma, .wmd, .wmp, .wmv, .wmx, .wpl, and .wvx), Macromedia flash (identified by ".swf" extensions), for example. Various file types, including raw data file types, may be used so long as appropriate encoding and decoding mechanisms are available to the system.

Hence, content files 107 may vary in size from a few thousand bytes to hundreds of gigabytes or more when encoded using industry standard formats. Content files 107 may also comprise still images and/or audio files or text files that are considerably smaller. Accordingly, the high bandwidth broadcast/multicast solution shown in FIG. 1 may be modified as needed, or eliminated in some cases, to meet the needs of distribution content items 107 used in a particular application. Suitable alternatives include terrestrial cable and microwave transmission and other data communication technologies. Other alternatives include physical disk based transport techniques such as digital video disk (DVD), high definition DVD (HD-DVD), various compact disk formats, portable drives, and the like.

In operation, content scheduling information 109 is distributed to specific facilities 200 that will use that scheduling information. For example, if a content item 107 is to be used only in theatres in New York City, scheduling information 109 associated with that content item 107 will be communicated only to facilities 200 that are in New York City. Scheduling information may be selectively communicated based on a variety of factors including geography, venue size, number of auditoriums in the facility 200, audience demographics, attendance rates, sales volume, and the like as determined by the content provider's desires.

In a particular implementation, content items 107 are distributed using a full multicast to all facilities 200 irrespective of whether each facility 200 will have use for the particular content item 107. Full multicast is efficient in implementations in which digital broadcast satellite is used because a single transmission reaches all facilities 200 at the same time. By transferring all content items 107 to all facilities 200 the need for re-transmission of any content item 107 is reduced or eliminated. Full multicast is particularly convenient in that content items 107 can be transferred in advance of scheduling information, enabling the scheduling system to remain completely flexible up until nearly the instant that a particular content item 107 is presented. Facilities 200 can then implement processes to selectively remove content items 200 that are not needed. Alternatively, content items 107 may be distributed by unicast and/or targeted multicast only to facilities 200 that will have use for the particular item. This selective distribution may conserve storage and processing resources at each of facilities 200 and therefore have advantages in some applications.

The present invention contemplates both a push system in which content items 107 are pushed to particular facilities 200 or groups of facilities 200 that will use the content items, or by a pull a system in which facilities 200 request content items 107 that they will need. With respect to content items 107, delivery is primarily a push system so that content items 107 are distributed in advance of schedule information 109. In an exemplary push system, data server 500 initiates transfers of content items 107 to all or targeted display device clients 205 (shown in FIG. 2) within facilities 200. In an exemplary pull system, data server 500 generates but sends content items 107 to the appropriate facility 200 in response to a specific request from an display device client 205. It is further contemplated that hybrid push-pull systems will be useful in many instances. For example, in a push system, servers 203 and/or display device clients 205 may initiate a content pull if they discover that scheduled content items 109 have not yet been delivered by the push mechanisms.

Similarly, the present invention contemplates that scheduling information 109 (and commands related to scheduling) can be distributed by push or pull methods to facilities 200. In an exemplary push system, data server 500 initiates transfers of scheduling information 109 to appropriate display device clients 205 (shown in FIG. 2) within facilities 200. In an exemplary pull system, data server 500 generates scheduling information 109, but sends it to the appropriate facility 200 in response to a specific request from an display device client 205.

Figures 2, 3, 4:
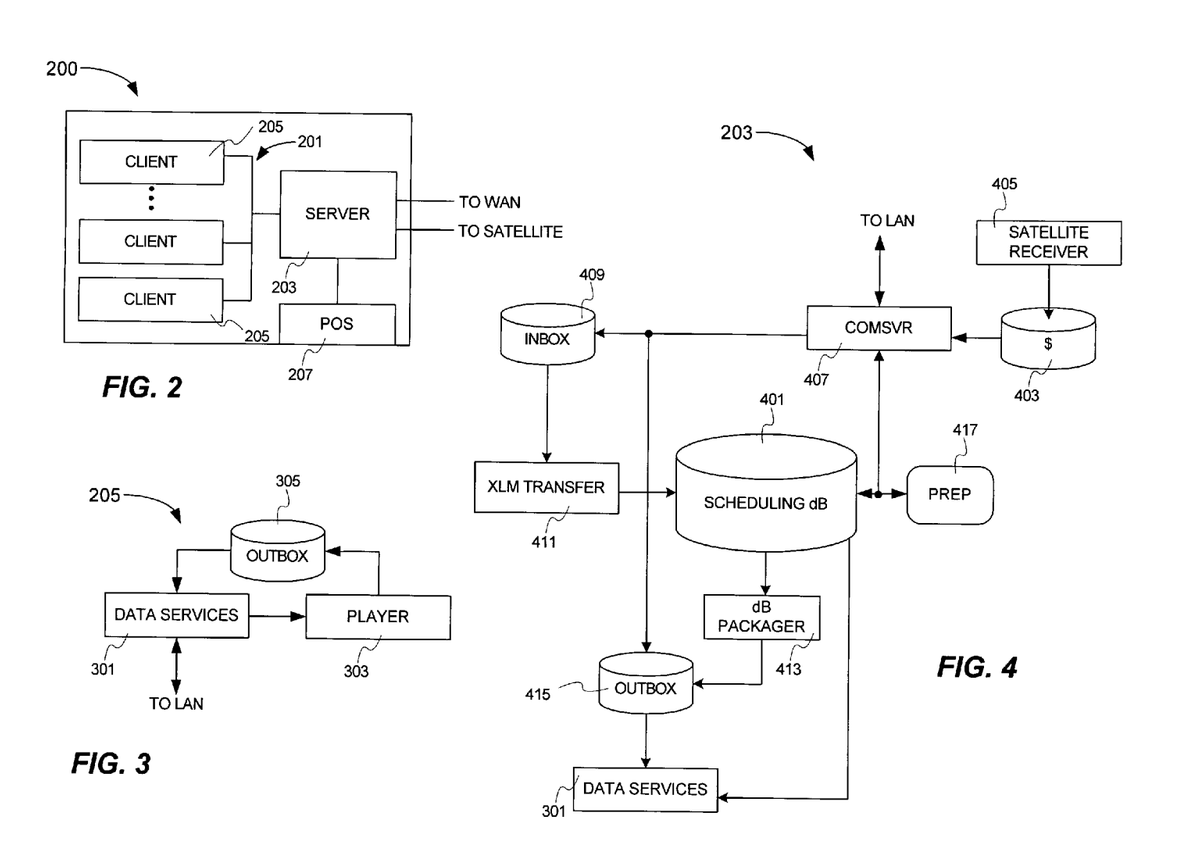
FIG. 2 shows an exemplary theatre implemented in accordance with the present invention in functional block-diagram form.
FIG. 3 illustrates in functional block-diagram form auditorium components of a theatre system in accordance with the present invention.
FIG. 4 shows an exemplary server components in accordance with the present invention in functional block-diagram form.

FIG. 2, FIG. 3 and FIG. 4 together illustrate various data processing and storage components implemented in presentation facilities 200 in a specific implementation. The push and pull systems introduced above are implemented in particular examples with substantially similar data structures, although the precise implementation of data structures may be varied significantly from the specific examples given herein. As shown in FIG. 2, most facilities 200 comprise a server 203 and a plurality of display device clients 205 coupled together by a network 201. Network 201 may comprise, for example, an available local area network (LAN) such as Ethernet, Fibre Channel, IP networks and the like having data transfer rates suitable to meet the needs of a particular application. Server 203 implements communication interfaces with satellite 103 and WAN 101 shown in FIG. 1.

Server 203 implements processes and data structures that are used to schedule and coordinate presentation of sequences of content items 107 in the form of, for example, digital content show presentations. Server 203 receives scheduling information 109, requests and receives content items 107 and implements caches for temporary local storage of content items 107 and scheduling information 109.

A facility 200 comprises one or more presentation devices such as displays, sound systems, scoreboards, media players, slide projectors, and the like. Each display device client 205 corresponds to a set of software processes that coordinate the presentation of content items 107 in a particular auditorium. Display device clients 205 may include interfaces for automating the projection/audio equipment, or the projection/audio equipment may rely on human operators.

FIG. 3 shows an embodiment of a display device client 205 in greater detail. Display device client 205 implements a connection to LAN 201 and implements a data services instance 301 and one or more media player components 303. Data services component 301, an instance of which also appears in server 203, comprises processes that handle communication with server 203 through LAN 201 and implement the communication protocols and resource allocation needed to support this communication.

By way of a specific example, a presentation or media stream comprises a number of content items 107 that are presented in a particular order to create the presentation. In many cases, a presentation may include some content items 107 that are scheduled to be presented at a particular time, such as a feature presentation in a movie, a particular live or broadcast event, or the like. Other content items 107 may have flexible start times that may be set just before presentation. The scheduling functions of the present invention operate to seamlessly coordinate and synchronize the presentation of the content items with flexible schedules along with one or more content items 107 that have specified schedules. Each client 205 receives a "boxtime file" that lists the start time for content items 107 that have a specified start time that are scheduled at that presentation device for that day. Data services component 301 looks at the play list data structure and calculates the length of that play list (e.g., the amount of time required to present all content items 107 on the play list). Data services component 301 then uses this time and starts the player application in direct relation to the listed show start time.

To implement a schedule-pull system, data services component 301 will include processes for polling server 203 and/or data server 500 as needed to determine if there is any new scheduling information 109 that should replace the currently active scheduling information 109. Upon determination that new scheduling information 109 exists, a transfer of that new scheduling information is initiated. A particular client 205 may hold multiple play lists 600, but only one play list 600 is active at any given time. In a schedule push implementation, scheduling information is pushed to client 205 such that polling processes are not required.

Figure 6:
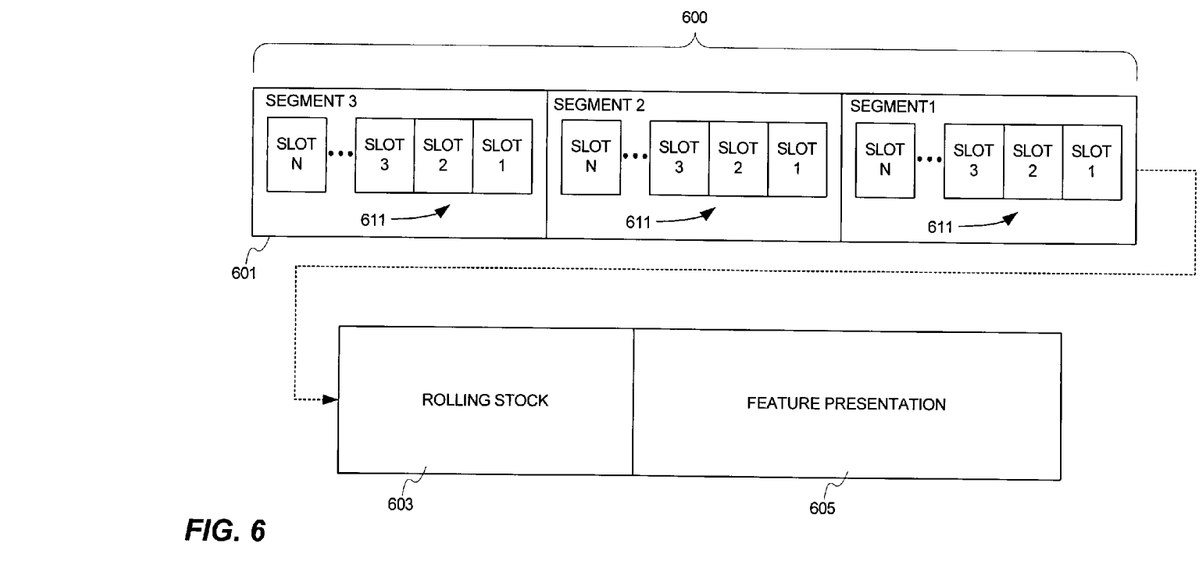
FIG. 6 illustrates an exemplary scheduling architecture in accordance with a particular implementation of the present invention.

The sequence of content items 107 that is to be played by any particular display device client 205 is defined by a play list represented by a play list data structure 600 described in reference to FIG. 6. A play list 600 is generated by server 203 and/or data server 500 from the inventory information contained in schedule grid 900 (shown in FIG. 1 and FIG. 9). A play list 600 is specific to a particular display device client 205, although it is contemplated that two or more display device clients 205 may have similar play list 600. Play list 600 is communicated to data services component 301 in addition to the information about specified start times, if any, of the media steam. In a particular example, data services component 301 implements a cache structure (not shown) for holding a copy of the content items 107 that will be included in a particular sequence being presented. Alternatively, data services component 301 may be used to pull cached content items 107 from storage within server 203.

In a particular example, outbox 305 is used to store messages indicating summary information about the status of the presentation of data items 107. As a data item is played, a message (e.g., an XML document) is created to indicate information such as the time at which the data item 107 played, the auditorium in which it played, and the like. It is contemplated that any level of detail about the playback may be maintained in this manner. The playback message may contain information about the audience size, audience demographic information, or information indicating the feature presentation that is scheduled to be presented in conjunction with the data item 107. This record is transmitted through data services 301 to server 203 and can be used to provide an auditable record of content item presentations. Some prior audit systems create a record each time a content item is decrypted for licensing purposes, but such records do not actually confirm that a particular content item has been presented. In contrast, the present invention allows a positive confirmation that a content item was actually presented.

FIG. 4 illustrates functional components of an exemplary server 203 in greater detail. Server 203 services all display device clients 205 in a given presentation facility 200. Content items 107 are received through satellite receiver interface 405 and stored locally in cache data store 403. A comsvr component 407 implements processes to support both push and pull functionality for accessing content items and populating cache 403 with content items 107. In the case of a content push system it is possible that many content items 107 will be delivered that have little or no use in a particular server 203. Server 203 implements processes, for example within comsvr component 407, that manage cache data store 403 using an appropriate algorithm such as least recently used (LRU), time in cache, first in first out, or the like.

In a particular implementation, comsvr component 407 checks for updated schedule information 109 that is ready to be sent to server 203. This update service is used in two primary logical locations: at the data center 500 to push out updated schedule information 109, and in server 301 to push updated content items 107 and play-lists 600 to the display device clients 205.

Schedule database 401 is implemented, for example, by an MSDE (Microsoft data engine) database available from Microsoft Corporation. However, any available database engine may be used such as mySQL database server from mySQL AB, Oracle database produces from Oracle Corporation and the like. As shown in detail in FIG. 8, schedule database 401 stores the local facility 200 schedule information 109 as well as information regarding presentation characteristics and attributes and show times. Schedule database 401 serves as a collection point for content item playback transaction data received through inbox 409 and XML transfer component 411. That is, schedule database 401 stores the XML records that hold information about which ads played in which auditoriums and when. The playback information is communicated through database packager 413 and outbox 415 to data center 500 on a regular basis. Database packager 413 operates to reformat and/or aggregate playback records to simplify communication and handling, if desired.

Data services component 301, which is substantially similar to that described in reference to FIG. 3, is used on server 203 to handle the delivery of updated schedule data. Data services component 301 is adapted to connect to local schedule database 401 and update it accordingly. Alternatively, this function may be handled by the Play List Prep service 417 (labeled "Ad Prep" in FIG. 4). Play List Prep service 417 comprises a set of processes that manage the play-list generation within the presentation facility 200 it is serving. Play List Prep service 417 reads a schedule grid 900 (shown in FIG. 1 and FIG. 9) to obtain inventory information for each display device client 205 in that facility 200 and uses this information to determine what the play list 600 for each display device client 205 should look like and when it should be delivered.

Play List Prep service 417 then creates a "queue table" 1001 (shown in FIG. 10) which is essentially a command queue representing various scheduling information and other commands to be implemented in a particular client 205. Queue table 1001 includes a plurality of entries where each entry corresponds to a particular command to be implemented. Each entry identifies the display device client 205 and a network address of that display device client 205 (e.g., an IP address, MAC address, uniform resource locator or the like). Each entry includes some command/scheduling information such as a pointer to a content item 107, a play list 600 or pointer to a play list 600, or an op-code for a particular operation such as to activate a particular play list 600 or reboot the client 205.

Figures 8, 9, 10:
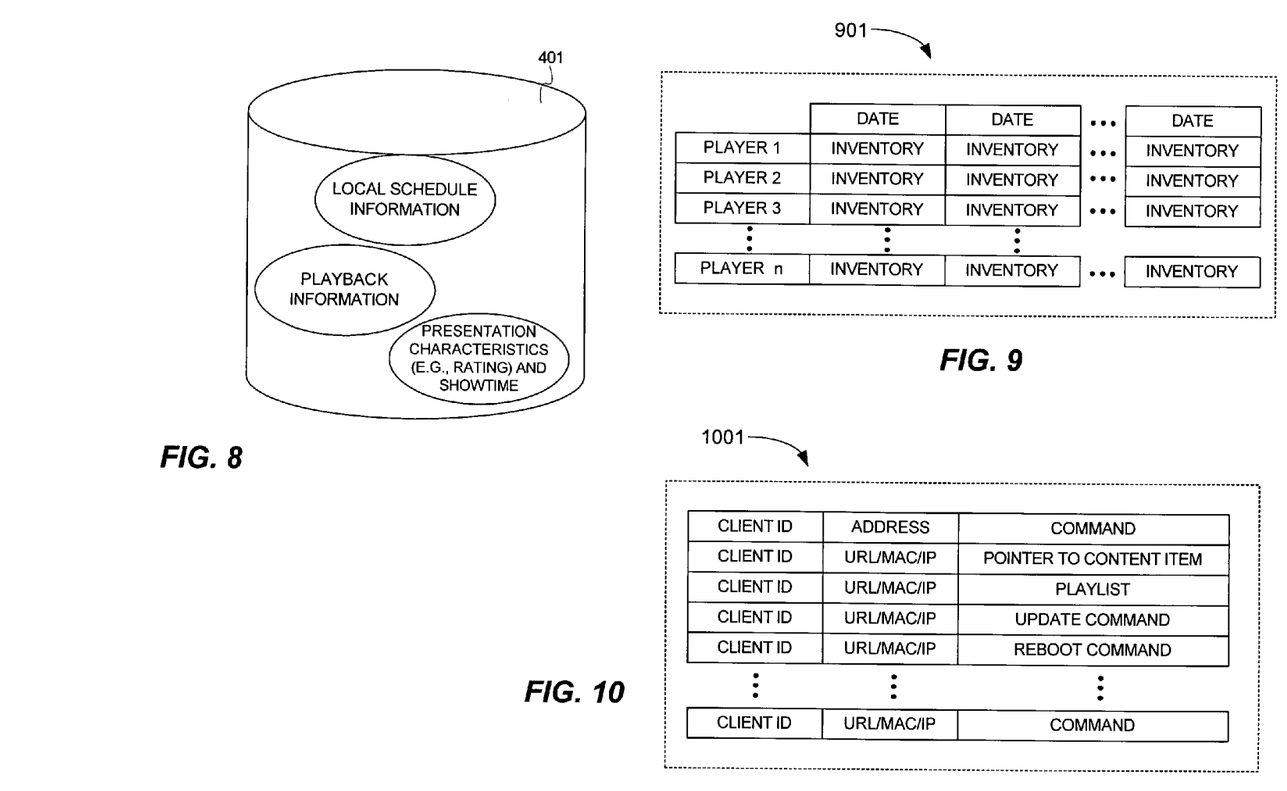
FIG. 8 illustrates an exemplary theatre schedule database in accordance with the present invention.
FIG. 9 shows an exemplary scheduling grid data structure used in a particular embodiment of the present invention.
FIG. 10 shows an exemplary "queue table" data structure used in a particular embodiment of the present invention.

In operation, entries in Q-table 1001 are distributed to the specified client 205 and executed by that client 205. Play List Prep service 417 creates the play list and queues up necessary content items 107 just before the play list 600 is supposed to start. This just-in-time system ensures that the latest scheduling information 109 is being used. For example, if a content provider has modified the content item(s) 107 that are intended to be presented, Play List Prep service 417 will note the change and ensure that the display device client 205 uses the updated content item 107 rather than stale content that might have been previously transferred. Further, the last minute generation of a play list 600 will contain a correct play list 600 even when last minute auditorium changes occur.

FIG. 5 illustrates functional components and processes implemented by data center 500 in a particular embodiment. A scheduling user interface 501 is configured to accommodate data display and entry for creating scheduling information 109. The scheduling information 109, includes an "presentation contract record" 701 that is shown in greater detail in FIG. 7. A site selection interface 503 is configured to accommodate data display and entry for allowing the specification of presentation requirements, presentation preferences, geographic preferences, or any other criteria recognized by the particular implementation. Scheduling records 701 are scheduled by placing them into inventory represented in scheduling grid 901. It is also contemplated that data center 500 may maintain a table that specifies contracts are considered 'default' contracts". Default content items may identify entertainment items, general interest announcements, non-revenue content items that present information on how to purchase advertising space, general interest messages, instructional messages, safety messages, and the like. Default content items may be added to a play list 600 when there is unused inventory for a particular day at a particular client 205.

FIG. 6 illustrates an exemplary data structure for a play list 600. The present invention contemplates shows that comprise only digital content items 107, as well as shows that comprise a mix of digital content items 107 and other content such as a live presentation or film-based content. In the former case, the play list 600 may define the entire show. In the later case, play list 600 may define the digital content portions of a show. A play list 600 can be broken down into a number of different segments 601. Each segment 601 can be specified to be a different length and/or contain a different number of slots 611. In a particular implementation, each slot 611 represents 15 second time window and may point to at most a single content item 107. Within each segment 601 content items 107 can be weighted by specifications from the schedule record such that the content items 107 will tend to be placed in slots towards the beginning or end of a segment 601 depending on the desired result. For example an content provider may decide they want content items 107 to be in the third segment 601 of the play list 600, but they want to be the last content item played within that segment 601. When the show comprises non-digital content, play list 600 is followed by, for example a rolling stock presentation 603 and a feature presentation 605. Optionally, where automation components are used, the play list 600 may specify the state of other controllable features of the environment such as lighting levels, volume levels and the like.

Figure 7:
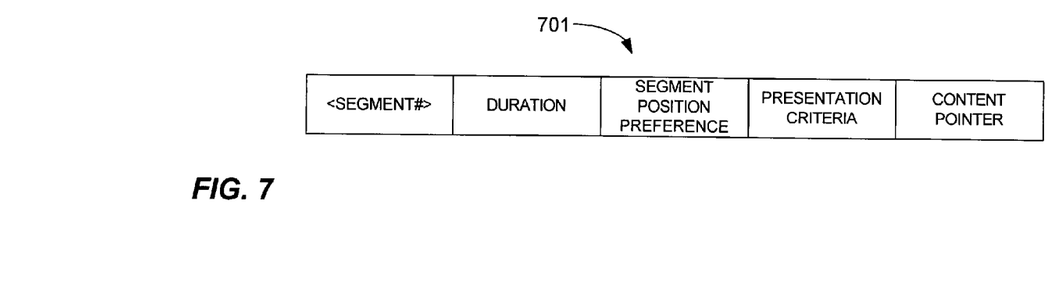
FIG. 7 shows an exemplary scheduling record in accordance with the present invention.

FIG. 7 illustrates an exemplary content item schedule record that contains scheduling information 109 related to a particular content item 107. This information includes, for example, presentation requirements designated by the content provider such as a requirement that the associated data item be presented in a media stream containing a movie having a particular movie rating. This information also includes presentation preference information such in which segment of play list 600 the data item should appear and whether there is a preferred slot within the segment. Information about the duration of the data item which may be measured in terms of a number of slots consumed, is also included.

Figure 11:
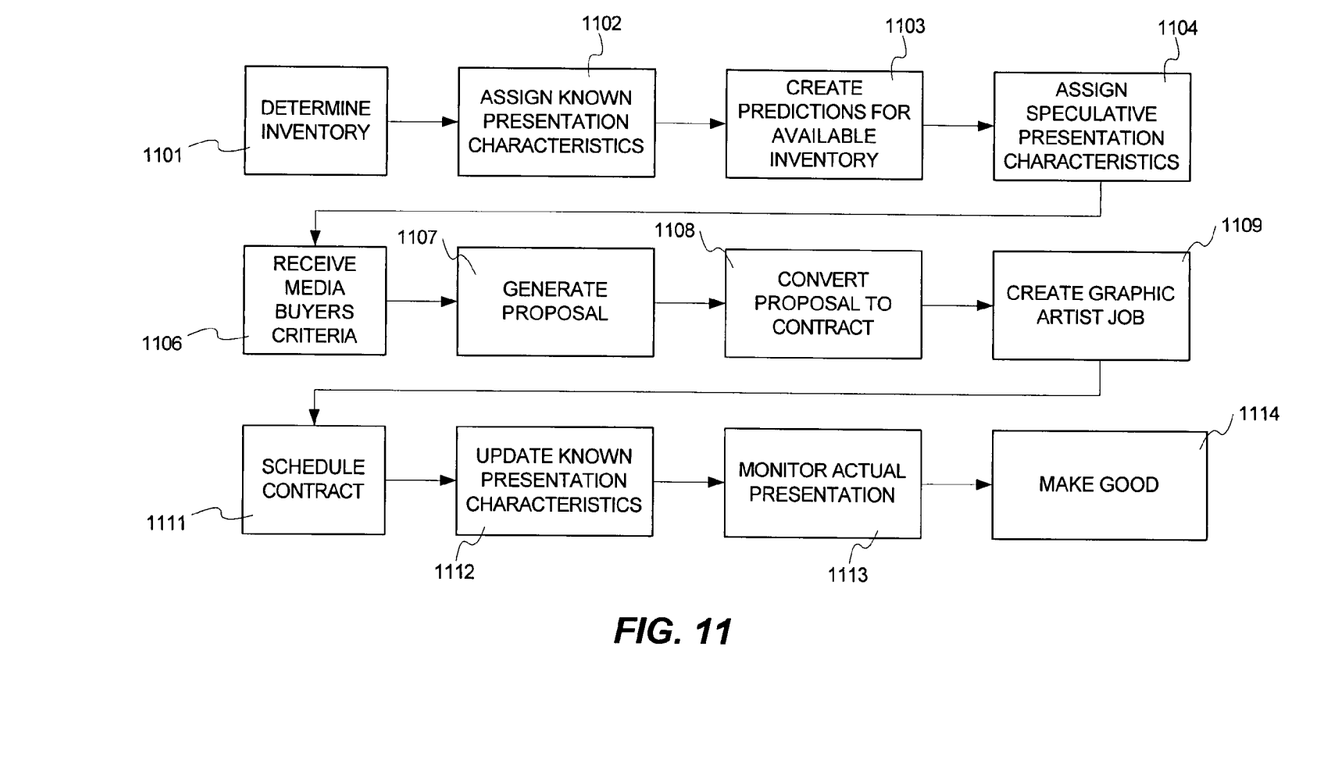
FIG. 11 is a flow diagram illustrating a workflow related to using the systems and methods of the present invention.

In an exemplary work flow shown in FIG. 11, operations are performed to create/identify inventory as well as support inventory sales and scheduling of media buys. Although the flowchart format of FIG. 11 suggests a sequential ordering of the various processes, it should be understood that the processes are ongoing and often occurring in parallel. For example, as content items are scheduled, the presentation characteristics of a media stream become better known, which in turn may affect the availability of either actual or speculative presentation segments in the inventory. Accordingly the activities shown in FIG. 11 may be performed in various orders in a practical implementation.

In 1101, the various presentation devices and available media streams are examined to determine the available inventory of presentation segments throughout the system. For example, a theatre with have presentation segments available before each movie showing, a theatre lobby display will have presentation segments available for each hour the theatre is open for business, a sports facility will have presentation segments available for each display device during scheduled events, a conference center will have presentation segments available during scheduled conferences, and the like. The inventory comprises a number of segments that will be potentially available at any given day. The segments may have various known presentation characteristics associated with them at this stage such as location of the display mechanism, type of event associated with the presentation, length of the segment, type(s) of media that can be presented during the segment, and the like. These known characteristics are associated with the segments in 1102.

In 1103, various techniques are used to create predictions of presentation characteristics that are unknown, but will likely be available. Operation 1103 may involve statistical modeling, historical performance studies, extrapolating, or even using experts to determine characteristics based on opinion. By way of comparison, an actual presentation characteristic for a segment may comprise the knowledge that the segment will comprise a three-minute audio/video advertisement in a theatre in Duluth, Minn., whereas speculative information may comprise that the segment will be presented before an "PG" rated movie. Some or all of the segments are associated with speculative presentation characteristics in 1104. Depending accuracy of the predictions and modeling performed in 1103, it may be desirable to only assign speculative characteristics to only a portion of the segments in inventory. This will decrease the likelihood of overselling a particular type of inventory if in fact the actual characteristics of the segment change as segments are sold and content items are actually assigned to a presentation.

The processes involved in the present invention include sales and marketing processes enabled by the present invention. For example, when sales personnel meet with a media buyer who desires to purchase a presentation segment to present digital content at a presentation location, the sales personnel determine requirements and preferences in operation 1106 with respect to particular content items the media buyer may specify geographic requirements, presentation requirements, or the like as described above. The sales personnel create a "customer proposal" in 1107 (and labeled 1201 in FIG. 12) using the systems and processes referred to herein as a "Proposal Machine". The proposal 1201 indicates, for example, the identity of facilities 200, pricing information, the length of the proposed engagement and the segment of a media stream that the media buyer would like the digital content to appear in, and other actual and speculative characteristics of the presentation segments being offered in the proposal.

Once the media buyer agrees to the proposal, the proposal 1201 is converted into a presentation contract 701 in operation 1108. Optionally, a job is created for a graphic artist to create, edit, and/or augment content items involved in the contract in 1109. A scheduler then schedules the contract into a schedule grid 901 in operation 1111, following the contract details of length of contract, sites selected, rate(s), position(s) in play list, as well as presentation criteria. Once scheduled, a play list 600 is generated and entries in Q-table 1001 are generated. Clients 205 then follow the directions from the Q-table 1001 to cause presentation of content items 107 according to the scheduled contracts.

In this manner, the present invention allow presentation contracts to be written without "total" knowledge of the future. For example, it is possible to estimate the number of screens available for a particular content item requirement using average percentages of movies that are classified with each movie rating. From this estimate "virtual auditoriums" can be used as "place holders" for digital content shows with particular requirements or characteristics. The system can then schedule media buys (e.g., presentation contracts) to the place holder auditoriums, thereby selling this speculative inventory before it actually comes into existence, and tracking that inventory through the term of the contract. As specific films are scheduled in specific auditoriums, real inventory becomes available and the contracts can be reassigned to an appropriate auditorium. The system of the present invention is desirably able to reconcile this virtual inventory against the actual inventory that is created at show time.

As content items are scheduled, the presentation characteristics of some or all of the remaining content items in a media stream or presentation may change. For example, once an advertiser such as "Cola Company" purchases a segment in a media stream, the character of the other segments in that media stream has changed, particularly from the viewpoint of a media buyer representing a competing cola company. Optional operations 1112 can update the actual and speculative presentation characteristics of the inventory so that future proposals and contracts can account for the newly scheduled material.

Other optional processes 1113 and 1114 can be useful to ensure satisfaction of a media buyer's requirements and preferences. In operation 1113, the actual presentation characteristics that exist at the time of presentation are monitored and compared to characteristics specified in the proposal/contract. In this manner, the system can determine whether the requirements and preferences were satisfied. It is also contemplated that situations will arise in which a segment of speculative inventory fails to materialize. In a movie theatre, the actual movies showing on a particular date may not provide the predicted mix of movie ratings. As a result, some purchased segments may not be shown, or may be presented in a manner that does not satisfy all contract requirements. In this case, make good operations 1114 may be employed to adjust future schedules as needed to satisfy the contract requirements, or some other compensatory action initiated to ensure satisfaction of the media buyer's requirements.

Operations 1113 allow the present invention to monitor the actual performance of revenue contracts that are being presented. Revenue contracts are contracts that are sold to customers and have presentation criteria specified, in contrast with non-revenue contracts such as internal advertising, audience entertainment material, public service contracts and the like. In a particular application, make-good processes 1114 are only implemented for revenue contracts. In one embodiment, users of the system have an interface that they can use to identify and select "under performing" contracts in operation 1401. In operation 1403, this embodiment of the present invention generates "make-good" flights for the identified under performing contracts.

While it is possible to monitor each and every presentation and perform make-good operations 1114 whenever an individual performance does not satisfy presentation criteria, this fine level of granularity will be inefficient in many cases. Media stream buyers are typically concerned with satisfying the contract-specified presentation criteria over a number of presentations spanning a period of time ranging from days to weeks or years, and are less concerned with whether a specific presentation satisfied the criteria expected for that specific presentation.

In a specific embodiment, a make-good flight is created and/or checked in different ways depending on the nature of the contract. For example, a contract that runs two weeks or less may require frequent monitoring in 1113 such that the system checks on daily basis to identify under performing contracts. This is because when the contract runs over a long period time there is a greater likelihood that an under performance early in the contract will be satisfied or compensated for by later performances in the contract. Accordingly, for longer running contracts it may be beneficial to perform the make good operation 1114 less frequently. In a specific example, for contract runs of two weeks to six months, make goods processes 1114 may be performed weekly rather than daily. Contract runs of six months and longer may require make-good operations to be performed monthly.

Make-good operations 1114 may also be performed in a manner that differentiates between the degree to which the actual performance under performs or fails to satisfy the contract-specified presentation criteria (i.e., the variance). For example, consider a contract that specifies a number of auditoriums in which a particular content item must be presented over a six month period. If monitoring operations 1113 reveal that a percentage of sites that did not receive the ad is less than 0.5%, the contract may specify that no action is required and operations 1114 will be avoided. In the event that the variance is in the range of 0.5% to 1%, operations 1114 may involve a notification to the media buyer and giving the media buyer an option to make good or not. Other compensatory arrangements such as a discount on a future media buy may be more desirable to a media buyer, particularly if the content items are no longer part of the media buyers current strategy. In the case of a larger variance, such as a variance in the range of 1% to 5%, the media buyer (or the media buyer's representative) is notified and requested to select a type of make good they desire, but unlike the less severe variances, some form of make-good will be required.

In the case of severe variances of greater than 5%, some form of make-good will be also required. In addition, for contracts in which the media buyer is represented by an independent representative or agency, operations 1114 may require that the media representative's client be specifically notified. Severe variances indicate a problem in the statistical models used to generate the speculative inventory. Accordingly, in addition to generating make-good flights in operation 1114, it may be desirable to notify system administrators so that the models used to predict inventory are appropriately adjusted.

The present invention contemplates several of the options to be made available to the media buyer or the media buyer's representative in performance of the make-good operations 1114. For example, a new make-good flight can be created that identifies one or more new locations, auditoriums or the like. In another option, the end date of the existing contract may be extended to. Alternatively, the existing contract may be modified to add additional or bonus locations/auditoriums to thereby satisfy the presentation criteria. As another resort, some or all of the money paid for the contract may be refunded or credited to a subsequent contract.

It is also contemplated that some contracts may specify ranges for particular presentation criteria rather than single values. For example, a contract may specify that a content item be presented at least a minimum number of times, yet the media buyer is willing to pay for presentations in excess of the minimum number up to a specified maximum. Alternatively, a contract may specify a "best efforts" type criteria where the media buyer does not specify a minimum, but specifically agrees to purchase locations in a media stream when no other purchaser has been identified at presentation time. The monitoring and make-goods processes 1113/1114 are useful in these situations as well in that the ability to monitor actual presentations and compare that to contract specified criteria enables the system operator to meet the contract specifications, and to account for actual presentations as they occur.

Figure 12:
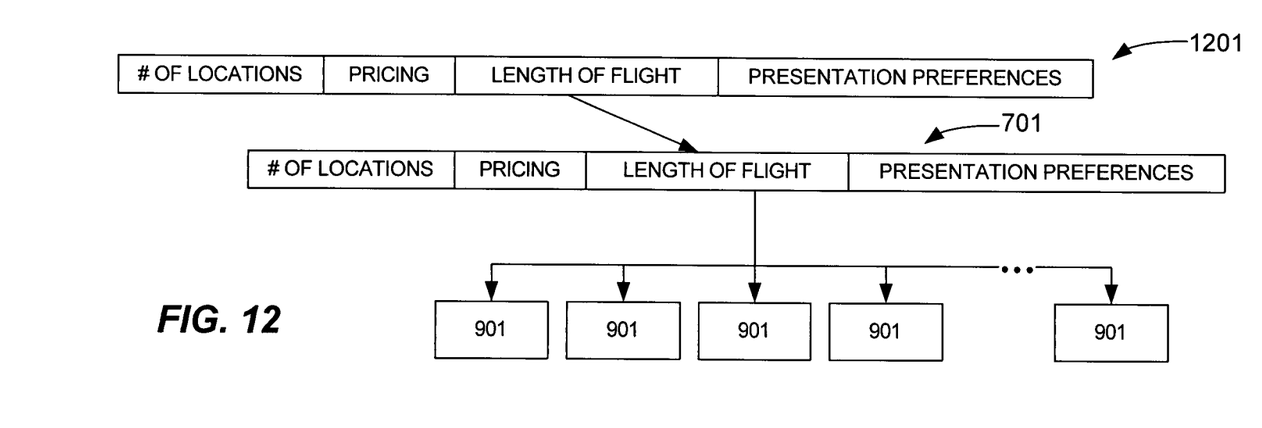
FIG. 12 shows data structures involved in an implementation of the present invention.
Figure 13:
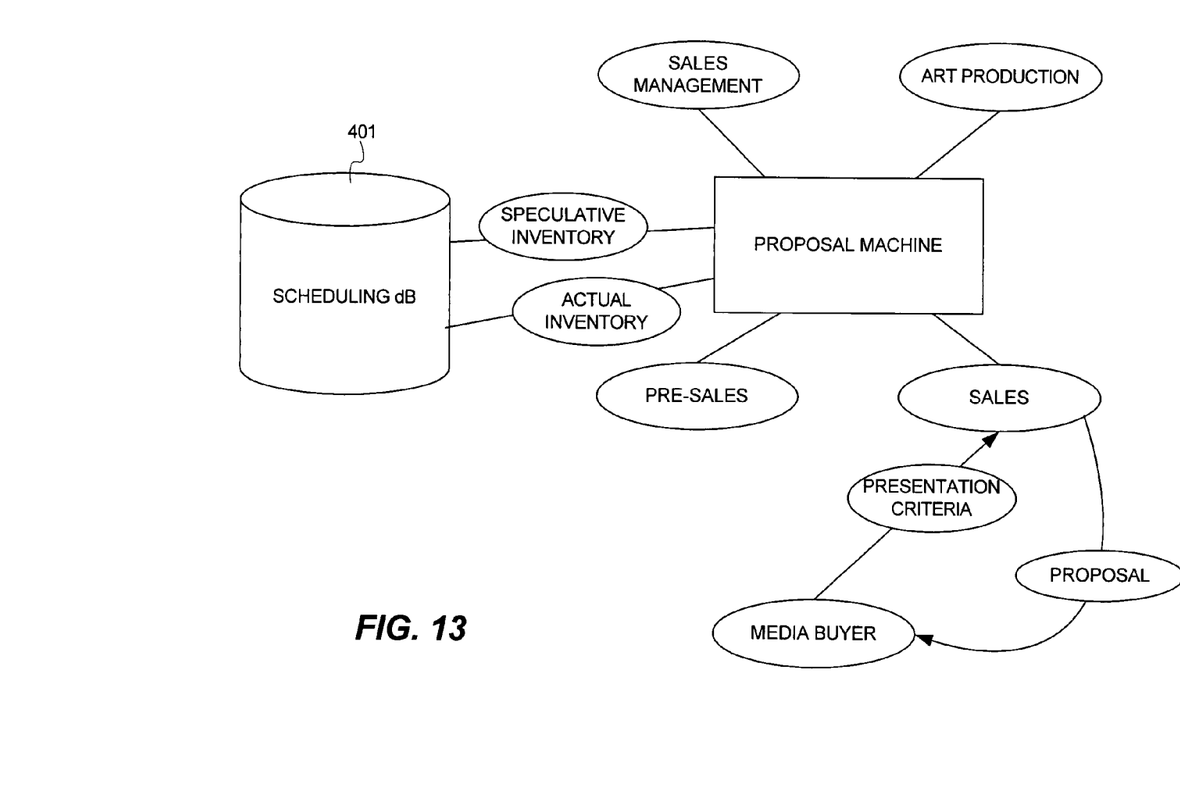
FIG. 13 illustrates an exemplary workflow in an entity relationship diagram.

Referring to the entity relationship diagram of FIG. 13, a variety of entities communicate and exchange data with the proposal machine processes. Sales and Pre-sales personnel use the system to create proposals 1201 for media buyers. Sales management can view all proposals and contracts that have been entered into the system. The sales management team may use this application as a tool to see what sales the sales team is currently pursuing. Among other things, this will provide them with some data on which they can build sales forecasts and foresee potential inventory shortages. Art production creates, collects, and modifies, any digital content so as to conform to the digital content specifications. The proposal machine draws on information within the scheduling database 401 to create speculative and actual inventory, as described hereinbefore, for use in generating proposals and buying and selling segments within media streams.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for scheduling presentations within a media stream comprising:

defining an inventory of media segments within the media stream by speculatively assigning characteristics to media slots;

determining a media buyer's presentation criteria for presentation of a particular content item;

a server generating a proposal that is only an offer of contract to a media buyer wherein the proposal identifies and stores on a storage medium a portion of the inventory of media slots selected to satisfy the media buyer's presentation criteria, wherein the identified portion of the inventory includes at least one speculatively defined media segment comprising a feature or event whose identity is not known; and updating speculative characteristics of the stored portion of the inventory of media slots based on subsequently scheduled presentations within the media stream.

2. The method of claim 1 wherein the act of defining an inventory is based upon expected availability of content items within the media stream that will satisfy certain criteria.

3. The method of claim 1 further comprising:

assigning a specific content item to a particular media segment, and wherein the act of assigning characteristics to media slots is performed before a specific content item is assigned to a particular media segment.

4. The method of claim 1 further comprising:

forming a contract wherein the media buyer accepts at least some of the media segments and an owner of the inventory agrees to present the media buyer's content in the accepted media segments according to the media buyer's presentation criteria.

5. The method of claim 1 wherein the proposal comprises pricing information for each content item included in the proposal.

6. The method of claim 1 further comprising scheduling the media buyer's content items by assigning particular content items to particular media slots.

7. The method of claim 6 further comprising scheduling presentation of subsequent content items within the media stream in a manner that satisfies the media buyer's presentation criteria.

8. The method of claim 6 further comprising re-ordering the scheduled content items in response to addition of subsequent content items such that the re-ordered schedule satisfies the media buyer's presentation criteria.

9. The method of claim 1 wherein the media stream comprises a rated movie and the speculatively assigned characteristics comprise probable movie rating.

10. The method of claim 9 further comprising:

reviewing historical information to determine historical presentation characteristics of previously played media streams;

using the historical presentation characteristics to predict the speculative presentation characteristics.

11. A non-transitory computer-readable storage medium tangibly, embodying a program of instructions executable by a machine wherein said program of instruction comprises a plurality of program codes for transacting presentation of content items within a media stream wherein the media stream comprises a plurality of media segments, said program of instruction comprising:

code for scheduling presentation of particular content items at times and locations based upon presentation criteria associated with the particular content items;

code for creating a proposal that is only an offer of contract for a media buyer to determine an inventory of media segments within the media stream, characteristics of content items scheduled in the media stream, and speculative characteristics of media segments within the media stream that have not yet been scheduled;

code for selecting and storing on a storage medium media segments with particular characteristics, including speculative characteristics, that satisfy the media buyer's presentation criteria; and code for updating speculative characteristics of stored selected media segments based on subsequently scheduled presentations within the media stream.

12. The computer-readable storage medium of claim 11 further comprising program code for:

reading schedule information, selecting content items in response to the schedule information, presenting the selected content items to form the media stream, and distributing schedule information to the plurality of distributed presentation locations.

13. The computer-readable storage medium of claim 12 wherein the schedule information is distributed independently from the content items.

14. The computer-readable storage medium of claim 11 wherein the code for creating the proposal operates either automatically or manually.

15. The computer-readable storage medium of claim 11 wherein the media stream comprises a movie.

16. The computer-readable storage medium of claim 11 wherein at least some of the segments comprises advertisements.

17. A method for automatically developing a proposal of presentation segments within a media stream from an inventory of available presentation segments, the method comprising:

receiving a specification including a media buyer's presentation criteria;

developing a first set of available segments based upon known presentation characteristics of the first set of available segments;

developing a second set of available segments based upon speculative presentation characteristics of the second set of available segments;

storing on a storage medium each set of available segments;

developing a proposal that is only an offer of contract for the media buyer of available segments from the first and second sets of available segments; and a server updating speculative presentation characteristics of the second set of stored available segments based on subsequently scheduled presentations within the media stream.

18. The method of claim 17 wherein each of the available segments in the proposal respectively includes a cost per segment.

19. The method as defined in claim 17 wherein presentation criteria specify at least one presentation characteristic and the first set and second set of segments have the specified presentation characteristic.

20. The method as defined in claim 17 wherein the presentation characteristic comprises at least one of the group consisting of: a movie rating, a presentation time, a maximum number of segments within the presentation, a minimum number of segments within the media stream, a media supplier identification, a segment position within the presentation, audience size, and an audience demographic characteristic.

21. A method for automatically developing a proposal of advertising segments for presentation within a media stream for a media buyer from a plurality of available advertising segments offered by an owner of a media presentation containing the advertising segments, the method comprising the steps of:

storing on a storage medium a plurality of representations of available advertising segments;

associating actual and/or speculative presentation characteristics to each of the plurality of representations of available advertising segments;

a server developing a proposal that is only an offer of contract for the media buyer comprising a subset of the representations based on media buyer specified variables; and updating presentation characteristics of the stored associated advertising segments based on subsequently scheduled presentations within the media stream.

22. The method of claim 21 further comprising:

allowing the buyer to select from amongst the representations within the proposal; and developing a presentation package by assigning specific content items to the representations selected by the buyer.

23. The method of claim 22 further comprising:

validating the package by ensuring that the speculative characteristics are satisfied upon creation of the media presentation containing segments purchased by the media buyer.

* * * * *